US008936841B2

United States Patent
Katarya et al.

(10) Patent No.: US 8,936,841 B2
(45) Date of Patent: Jan. 20, 2015

(54) THERMAL TRANSFER PRINTABLE FLUID LINE LABEL TAPE

(71) Applicant: Brady Worldwide, Inc., Milwaukee, WI (US)

(72) Inventors: Aaron Katarya, Rochester, MN (US); Adam M. Welander, Brown Deer, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 134 days.

(21) Appl. No.: 13/719,505

(22) Filed: Dec. 19, 2012

(65) Prior Publication Data

US 2014/0170341 A1    Jun. 19, 2014

(51) Int. Cl.
- B41M 5/40 (2006.01)
- B41M 5/52 (2006.01)
- B32B 27/30 (2006.01)
- G09F 3/02 (2006.01)

(52) U.S. Cl.
CPC .......... *B41M 5/5254* (2013.01); *B41M 5/5209* (2013.01); *B41M 2205/20* (2013.01); *B32B 27/308* (2013.01); *B41M 2205/28* (2013.01); *B41M 2205/32* (2013.01); *B41M 2205/38* (2013.01); *G09F 2003/0257* (2013.01)
USPC .................................................... 428/32.39

(58) Field of Classification Search
CPC .................................................. G09F 3/0295
See application file for complete search history.

(56) References Cited

U.S. PATENT DOCUMENTS

| | | | |
|---|---|---|---|
| 2,914,166 A * | 11/1959 | Bihler | 206/526 |
| 4,379,805 A | 4/1983 | Downing et al. | |
| 5,001,106 A | 3/1991 | Egashira et al. | |
| 5,737,114 A * | 4/1998 | Bailey | 359/268 |
| 7,081,284 B2 * | 7/2006 | Hiroishi | 428/32.6 |
| 2001/0009981 A1* | 7/2001 | DuBois et al. | 600/585 |
| 2006/0263564 A1 | 11/2006 | Steyaert | |
| 2007/0248810 A1 | 10/2007 | McGee et al. | |
| 2011/0268897 A1 | 11/2011 | Klemann | |
| 2011/0303353 A1* | 12/2011 | Dolsey et al. | 156/230 |

FOREIGN PATENT DOCUMENTS

EP    0950511 A2    10/1999

* cited by examiner

*Primary Examiner* — Mark Ruthkosky
*Assistant Examiner* — Laura C Powers
(74) *Attorney, Agent, or Firm* — Whyte Hirschboeck Dudek S.C.

(57) ABSTRACT

A thermal transfer printable multilayer label tape for identifying fluid lines, the tape comprising:
(A) A clear topcoat layer;
(B) A clear first primer layer in contact with the topcoat layer;
(C) A clear face sheet layer in contact with the first primer layer;
(D) A clear second primer layer in contact with the face sheet layer;
(E) A color layer in contact with the second primer layer; and
(F) An adhesive layer in contact with the color layer.

11 Claims, 2 Drawing Sheets

THERMAL TRANSFER PRINTABLE FLUID LINE LABEL TAPE

FIELD OF THE INVENTION

This invention relates to a label tape useful as an identification marker for fluid lines, particularly the fluid lines used in the aerospace industry.

BACKGROUND OF THE INVENTION

Many airplanes and other aerospace vehicles contain hundreds, if not thousands of meters of lines for carrying various fluids, e.g., fuel, oil, hydraulic fluids, refrigerants, heat transfer fluids, water and the like. Many of these lines, particularly lines carrying fuel, oil and hydraulic fluids, are clustered together and require clear and permanent labeling so that one line can be distinguished from another line. Since the areas or traces in which these lines are clustered often are exposed to harsh physical and/or chemical abrasion due to service and/or leaks, the labels need to be both easy to read and durable. Moreover, ideally these labels are easy for an end user to add by printing text or graphics and are easy to apply.

SUMMARY OF THE INVENTION

In one embodiment the invention is a multilayer label tape comprising:
(A) A clear topcoat layer comprising opposing first and second facial surfaces;
(B) A clear first primer layer comprising opposing first and second facial surfaces with the first facial surface of the first primer layer in contact with the second facial surface of the topcoat layer;
(C) A clear face sheet layer comprising opposing first and second facial surfaces with the first facial surface of the face sheet layer in contact with the second facial surface of the primer layer;
(D) A clear second primer layer comprising opposing first and second facial surfaces with the first facial surface of the second primer layer in contact with the second facial surface of the face sheet layer;
(E) A color layer comprising opposing first and second facial surfaces with the first facial surface of the color layer in contact with the second facial surface of the second primer layer;
(F) An adhesive layer comprising opposing first and second facial surfaces with the first facial surface of the adhesive layer in contact with the second facial surface of the color layer; and
(G) An optional release liner comprising opposing first and second facial surfaces with the first facial surface of the release liner in contact with the second facial surface of the adhesive layer.

The label tape of this invention exhibits good resistance to extremely harsh chemical environments as evidenced by its performance in tests performed with SKYDROL advanced fire-resistance hydraulic fluids, JP-8 military fuel, isopropyl alcohol, MIL 7808 fluid at elevated temperature, water immersion, and extended time at high temperature and humidity. When printed with a thermal transfer ribbon made from a metal salt of ethylene-methacrylic acid copolymer (such as R6400 from Brady), resistance to the harsh environments is maintained.

DETAILED DESCRIPTION OF THE PREFERRED EMBODIMENT

Definitions

Figure 1:
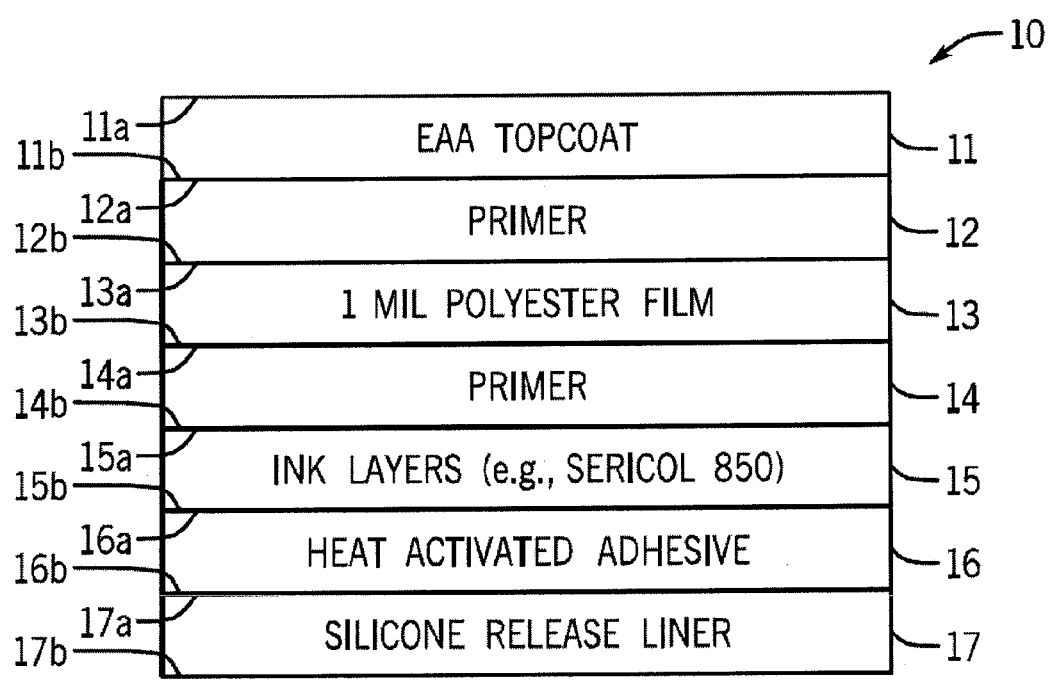
FIG. 1 is a schematic cross-section of one embodiment of the label tape of this invention.

Unless stated to the contrary, implicit from the context, or customary in the art, all parts and percentages are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of various components in the composition of a particular layer, the thickness of a layer, and the like.

"Layer" and like terms means a single thickness, coating or stratum spread out or covering a surface.

"Multilayer" and like terms means at least two layers.

"Facial surface", "planar surface" and like terms mean the flat surfaces of the layers that are in contact with the opposite and adjacent surfaces of the adjoining layers. Facial surfaces are in distinction to edge surfaces. A rectangular layer or label comprises two opposing facial surfaces and four edge surfaces. A circular layer or label comprising two opposing facial surfaces and one continuous edge surface.

"In contact" and like terms means that one facial surface of one layer and one facial surface of another layer, or the adhesive layer of a label and the exterior surface of an object or substrate to which the adhesive layer of the label is applied, are in an adhering relationship to one another such as a coating is in an adhering relationship with the substrate to which it is applied.

"Clear" and like terms means, as used to describe a layer of a label of this invention, that the layer is sufficiently transparent or translucent to allow an ordinary observer under ordinary viewing conditions to determine the hue of the color layer and to read any text or graphic. "Clear" includes both a layer without hue and a layer with hue.

"Water-based" and like terms means in reference to the topcoat layer that the resin systems are either water dispersions or water-borne emulsions, i.e., the water is the continuous phase of the emulsion.

"Comprising", "including", "having" and like terms are not intended to exclude the presence of any additional component, step or procedure, whether or not the same is specifically disclosed. In order to avoid any doubt, all processes claimed through use of the term "comprising" may include one or more additional steps, pieces of equipment or component parts, and/or materials unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

Label Tape

Topcoat Layer

In one embodiment, the topcoat layer of this invention is a water-based, crosslinked, thermal transfer printable polymer or polymer blend comprising an ethylene acrylic acid copolymer, silica, a surfactant and a polyaziridine-based crosslinker.

The ethylene acrylic acid copolymer is available as a water dispersion from Michelman. It is available dispersed in sodium hydroxide (Michem Prime MP48525, weight average molecular weight (Mw) of 31,000), in ammonia (Michem Prime MP4983R), or a lower molecular weight version of the ammonia dispersion (Michem MP4990, Mw of 17,000). The preferred ethylene acrylic acid copolymer I Michem Prime MP48525.

The silica used in the topcoat formulation of this invention includes but is not limited to Syloid C803, Syloid C805, Syloid C807, Syloid C809, Syloid C812, Syloid C816, Sylojet P405, Sylojet P407, Sylojet P409, Sylojet P412, Sylojet P416, Syloid W300, Syloid W500, Syloid 74, Syloid 234, Syloid 620, Syloid 4500, Syloid 5500, Syloid 6000 and Syloid 6500 all available from W. R. Grace; Sylysia 250, Sylysia 250N, Sylysia 270, Sylysia 290, Sylysia 310P, Sylysia 320, Sylysia 350, Sylysia 370, Sylysia 380, Sylysia 390, Sylysia 420, Sylysia 430, Sylysia 440, Sylysia 450, Sylysia 460, and Sylysia 470, all available from Fuji Sylysia; and Gasil HP220, Gasil HP39, and Gasil IJ45 available from Ineos Silicas. Preferred silica for the topcoat layer is Syloid C803.

Typically and preferably a surfactant is used to manage foaming potential and release air in the manufacturing process. An emulsifiable surfactant at a loading level of less than 1%, preferably within the class of "phosphoric esters", is effective. Examples include Moussex 941 PL, Moussex 561 PL, and Moussex 5064 PL (all from Synthron). The preferred surfactant is Moussex 941 PL which consists of 30-40% tributyl phosphate (active defoaming ingredient).

A crosslinker is used to enhance the durability of the coating. Crosslinkers include but are not limited to polyaziridines, melamine formaldehyde resins, urea formaldehyde resins, phenol formaldehyde resins, alkali metal hydroxides, zinc or zirconium complexes, epoxy resins, or polyethyleneimines. In one embodiment the polyaziridine is PZ-33 (Poly Aziridine, LLC, molecular weight 427-500).

Table 1 reports exemplary embodiments of the topcoat formulation of this invention.

TABLE 1

Exemplary Topcoat Formulations

| Component (Wt %) in dry coating | Broad Range (Wt %) | Intermediate Range (Wt %) | Narrow Range (Wt %) |
|---|---|---|---|
| Polymer Resin | 70-100 | 85-95 | 88-92 |
| Silica Particles | 0-30 | 1-8 | 3-5 |
| Surfactant | 0-5 | 0-3 | >0-1 |
| Additives | 0-20 | 0-10 | 0-5 |
| Crosslinker | >0-10 | 4-8 | 5-7 |
| Total | 100 | 100 | 100 |

The topcoat formulation can be prepared in any manner using conventional mixing equipment such as a cowles mixer, a suitable container, and conventional mixing blades. The order of addition of the formulation components can vary but typically the silica, surfactants and any additives are added to the polymer resin first and in any order or as a masterbatch, and the crosslinker is added last immediately before coating, drying, and curing onto a substrate.

The thickness of the topcoat typically ranges from 0.3 to 2.5 mils, preferably from 0.3 to 1 mil. The topcoat can be applied to the first or top facial surface of the first primer layer in any manner, e.g., slot die, rod, roll coating (reverse roll, gravure roll, roll blade, etc.), dip bath, spraying and the like.

First Primer Layer

In one embodiment the first primer layer is a polyester resin based coating that is used to promote adhesion of the topcoat to the facesheet. This primer layer promotes the humidity resistance of the topcoat layer.

Table 2 reports exemplary embodiments of the primer formulation of this invention.

TABLE 2

Exemplary Primer Formulations

| Component (Wt %) in Wet Coating | Broad Range (Wt %) | Intermediate Range (Wt %) | Narrow Range (Wt %) |
|---|---|---|---|
| Thermoplastic Polyester | 8-20 | 10-18 | 12-16 |
| Silica Particles | 0-5 | 0.5-3 | 1-2 |
| Solvent | 71-92 | 77-90 | 80-87 |
| Aromatic Polyisocyanate | >0-3 | 0.2-2.0 | 0.5-1.5 |
| Silane | 0-1 | 0.05-0.5 | 0.1-0.2 |
| Total | 100 | 100 | 100 |

The primer develops high adhesion to polyester film from the thermoplastic polyester. The aromatic polyisocyanate is used to develop solvent resistance. The silane serves to better couple the silica particles to the thermoplastic polyester. The silica particles provide improved adhesion to the topcoat layer. Solvents reduce the viscosity to enable coating in a thin layer.

The thickness of the first primer typically ranges from 0.3 to 2.5 mils, preferably from 0.3 to 1 mil. The first primer can be applied to the first or top facial surface of the facesheet in any manner, e.g., slot die, rod, roll coating (reverse roll, gravure roll, roll blade, etc.), dip bath, spraying and the like. In one embodiment the first primer is first applied to the facesheet, and then the topcoat is applied to the first primer.

Facesheet

The facesheet of this invention is a clear film the chemical composition of which is not critical to the invention so long as it has sufficient film integrity for the intended aerospace application. The material cannot be excessively thick due to product weight and stiffness constraints for a label to be wrapped on fluid line tubing (typically ¼" to 1" OD) found in aerospace applications. Typically, it comprises polyester, such as a condensation product of terephthalic acid and a glycol, e.g., ethylene glycol, isophthalic acid and a glycol, or mixtures of terephthalic acid, isophthalic acid and a glycol, or a polyetherimide. One particularly useful family of films of this type is a highly oriented polyester film known in the trade as MELINEX, which can be print treated or non-print treated. Other useful films can be constructed from polyethylene naphthalate (PEN) or polyetherimide (PEI). Films comprising polyethylene terephthalate (PET) are preferred. Thickness can range from 0.0005 inches to 0.002 inches. A 0.001 inch film thickness is a good compromise between handleability (thicker is better), and weight (lower overall mass is desirable).

Second Primer Layer

The second primer layer can be the same or different that the first primer layer. Its purpose is to anchor the color layer to the facesheet. The chemical composition of the second primer layer is the same as that of the first primer layer although for any particular label construction, the first and second primer layers can be the same or different. Preferably, the first and second primer layers are of the same chemical composition and thickness.

Color Layer

Suitable inks (with sufficient durability for aerospace applications) are described in U.S. Pat. No. 4,379,805. Other inks for this layer that are cured sufficiently to offer satisfactory durability can be used. Flexographic inks are preferred (as those in U.S. Pat. No. 4,379,805 or UV-cured flexographic inks available from various vendors such as Sericol (850 series).

Adhesive

The adhesive layer can comprise any adhesive that is effective in binding the label to an external surface of the object to which the label is affixed and endure the fluids and temperatures encountered in aerospace use. As long as the adhesive exhibits this durability, either a pressure sensitive or heat-sealable adhesive can be used. Preferably, but not necessarily, the adhesive also exhibits transparency and low haze. Particularly preferred is the heat-activated adhesive disclosed in U.S. Pat. No. 4,379,805. Alternative pressure sensitive adhesives include Durotak 230A (Henkel), Flexmount (Avery), Aroset 349 (Ashland), GMS 1753 (Cytec), and Aroset 1860 (Ashland), all acrylate-based.

If the adhesive is a heat-sealable adhesive, then it typically comprises a crosslinkable thermoplastic binder with limited solubility in the aerospace fluids and a blocked crosslinker which will react on heating to crosslink to develop further durability. These adhesives are more fully described in U.S. Pat. No. 4,379,805.

The thickness of the adhesive layer typically ranges from 0.3 to 2.5 mils, preferably from 0.3 to 1 mil.

Release Liner

Optionally, and preferably, the labels include a release liner that is adjacent to and in intimate contact with the adhesive layer to protect the adhesive before the label is applied to an object or substrate, e.g., during manufacture, printing, shipping and storage. Typical and commercially available release liners comprise a silicone-treated release paper, and are available from Loparex (products such as 1011, 22533 and 11404), CP Films and Akrosil, Crosslinker In one embodiment, the topcoat is crosslinked in order to improve chemical resistance. For some of the topcoats useful in this invention, crosslinking may also improve water resistance. One preferred class of crosslinking agent is aziridine. One particularly preferred crosslinking agent is PZ-33 tri-functional aziridine from Polyaziridine LLC. Preferably the topcoat polymer, e.g., EAA copolymer, is crosslinked with aziridine, melamine formaldehyde, or urea formaldehyde resin in order to obtain sufficient solvent resistance. Preferred crosslinking agents for these resins include PZ-33 tri-functional aziridine from Polyaziridine LLC, CYMEL 385 and 373 partially alkylated melamines from Cytec Industries; RESIMENE 717, 718, 741, 745, and 747 partially alkylated melamines from Ineos Melamines. In some cases the melamine formaldehyde resins may require an acid catalyst such as p-toluene sulfonic acid.

The crosslinker used in the primer layers (aromatic isocyanate) is added and mixed prior to coating on the film. Crosslinking proceeds on heating and drying the primer and continues for 7 to 14 days at ambient conditions. The topcoat crosslinker (tri-functional aziridine) is mixed with the topcoat prior to application to the primer layer. Crosslinking also proceeds on heating drying the topcoat. The crosslinker in the heat-activated adhesive (blocked isocyanate) is mixed with the adhesive prior to coating; however it is dried at a low temperature so unblocking does not occur until the end user has applied the tape and heats it. Once unblocked the crosslinking proceeds.

Fabrication

The facesheet is first coated with primer, first on one facial surface and then the other facial surface. The topcoat is subsequently coated to one facial surface of the facesheet. The coated facesheet material is then slit to appropriate width and the UV-inks are subsurface printed (to the remaining exposed primer coated side of the facesheet) and cured. This printing is done in reverse as it will be viewed through the topcoat in end used. Separately the adhesive is coated to a release liner. It is also slit to appropriate width and supplied to the converting facility. At the converting facility the adhesive is laminated to the UV-ink printed side of the facesheet, typically immediately after the inks are printed.

Ribbon Ink

A thermal transfer ribbon as described in U.S. Pat. No. 7,081,284 is made from a metal salt of an ethylene-methacrylic acid copolymer and is used to print the label so as to obtain the superior fluid resistance and durability required for aerospace fluid line labeling. Brady R6400 ribbon is a commercial example of this type of ribbon.

The following example is illustrative of one embodiment of the invention.

EXAMPLE

FIG. 1 describes label tape 10 which is one embodiment of this invention. The total thickness (excluding the release liner 17, is 0.0036 inches. This includes the primer layers (0.0003 inches each), the topcoat (0.0005 inches), the adhesive (0.0015 inches), and the facesheet (0.001 inches) Clear topcoat layer 11 comprises first or top facial surface 11a and second or bottom facial surface 11b. Topcoat layer 11 comprises 97.1 parts per hundred (pph) MP 48525R ethylene acrylic acid dispersion (25% solids) available from Michelman, 1.1 pph SYLOID 803 silica (3-4 micron particle size) available from W.R. Grace, 0.1 pph MOUSSEX 941 PL surfactant/defoamer (a tributyl phosphate) available from Synthron, and 1.6 pph PZ-33 (an polyaziridine) from Polyaziridine LLC and 0.1 parts of n-propanol (to rinse out any aziridine remaining in its container.

Second or bottom facial surface 11b of topcoat layer 11 is in contact with first or top facial surface 12a of first primer layer 12. First primer layer 12 comprises 83.04 pph of ADCOTE 1217-D, a polyester laminating adhesive available from Rohm and Haas; 1.395 pph LOVEL 275 silica gel available from PPG; 14.015 pph 1,3-dioxolane; 1.395 DESMODUR L 67 MPA/X, an aromatic polyisocyanate available from Bayer; and SILQUEST A-1120 silane available from Momentive.

Second or bottom facial surface 12b of first primer layer 12 is in contact with first or top facial surface 13a of facesheet 13 which is a 1 mil thick film of polyethylene terephthalate.

Second or bottom facial surface 13b of facesheet 13 is in contact with first or top facial surface 14a of second primer layer 14 which is compositionally the same as the first primer layer.

Second or bottom facial surface 14b of second primer layer 14 is in contact with first or top facial surface 15a of color layer 15. The inks can be either those disclosed in U.S. Pat. No. 4,379,805 or UV-crosslinked flexographic inks available from manufacturers such as Sericol or Nazdar. Preferred UV-inks are the Sericol 850 series.

Second or bottom facial surface 15b of color layer 15 is in contact with first or top facial layer 16a of adhesive layer 16. Adhesive layer 16 comprises T-2966 which is described as the heat activated adhesive disclosed in U.S. Pat. No. 4,379,805 and is available from Brady Corporation.

Finally, second or bottom facial surface 16b of adhesive layer 16 is in contact with first or top facial surface 17a of release liner 17. Release liner 17 is a 60 lb. super-calendared kraft (SCK) silicone coated paper available from various release liner manufacturers such as MPI or Loparex.

First or top facial surface 11a of topcoat layer 11 and second or bottom facial surface 17b of release liner 17 are open to the environment.

Wide web (48 inch wide roll) of polyester face sheet is taken through three coating passes. The first two passes are the primer layer on each side, which proceeds to crosslink on heating and drying. The third pass is the topcoat (applied to one of the primer layers) which also proceeds to crosslink on heating and drying. Separately the heat activated adhesive layer is coated on a transfer liner (also 48 inches wide) in a single pass through a coating machine. This is dried only, and the blocked isocyanate crosslinker is available for subsequent cure when the end user has applied the tape with heat. Both the top coated, primed, facesheet and the adhesive rolls are slit to 6 inch width. UV-inks are printed on the primer side of the coated facesheet in reverse for viewing through the topcoat. This continuous printing is done per customer specific requirements and typically includes text and/or graphics as well as colored backgrounds. The adhesive is laminated to the UV-inks after they cure (in process) and the rolls are slit to a finished width of per end customer requirements. The end customer can then subsequently print application specific text or graphics via thermal transfer printing at their site prior to final application and heat activation.

Figure 2:
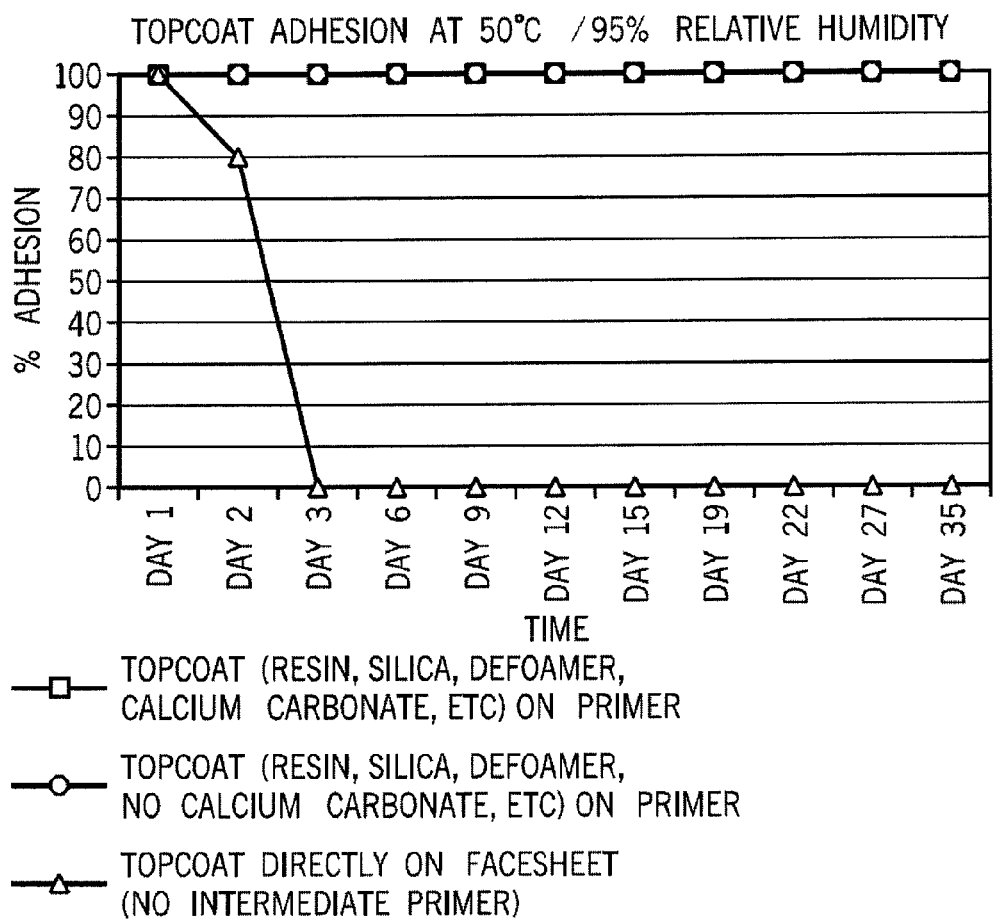
FIG. 2 is a graph reporting the effect of humidity on a topcoat layer in contact with a PET film, and on a topcoat layer in which first primer layer is disposed between the topcoat layer and the PET film.

FIG. 2 is a graph showing the effects of humidity exposure (95% relative humidity at 50° C.) on a topcoat layer coated directly on a PET film and on a topcoat layer in which a primer layer, here the first primer layer of the label tape of FIG. 1, is interposed between the topcoat layer and the PET film. This shows that this type of thermal transfer printable topcoat requires a primer to maintain sufficient adhesion to PET film after extended humidity exposure. The print test results below show that excellent resistance to the fluid exposures required in aerospace applications is maintained when printed with a ribbon comprising the metal salt of an ethylene-methacrylic acid copolymer. This resistance to degradation of the thermal transfer printing is surprising as it does not include the calcium or magnesium ion specified in U.S. Pat. No. 7,081,284.

The thermal transfer printable label tape is designed for identification of fluid lines found on aircraft. To determine the suitability of the thermal transfer print feature the following test protocol was developed. To confirm that the requirements for fluid resistance are met the preferred example prepared as above was tested and met all requirements as shown below.

Fluid Resistance and Print Testing

Test Procedure

The test samples dwell on the panel surfaces for 35 hours prior to fluid immersion.

A. Prepare separate containers containing each of the test fluids listed in Table 3.
B. Print the samples with a square 5.6 mm 2-D barcode and bold Arial font sizes of 7, 8 and 10 using a BRADYPRINTER™ PR 600 Plus printer and the Brady R6400 ribbon.
C. Prepare panel samples.
D. Immerse the panels in fluids 1-6 below (as specified in Table 3). The samples are allowed to dwell on the panels for 35 hours.
   1. Distilled water, 24 hours
   2. Turbine Engine Fuel, 72 hours
   3. Lubricating Oil, 24 hours, 93° C.
   4. Hydraulic Oil, 72 hours, 23° C.
   5. Cleaning Agent, 72 hours
   6. Anti-icing and de-icing agent, 72 hours
E. The specimens (on panels only) are removed after each immersion and allowed to drain. Each sample is rubbed with an eraser 10 times with firm pressure. The eraser is wide enough to completely cover the characters being rubbed.

Pass/Fail

Pass requires that the identification and barcode are clearly readable and show no visible deterioration of color, printing, or general film appearance such as to affect serviceability like cracking, curling, buckling or wrinkling. Slight discoloration that does not affect the serviceability is permissible. Furthermore the tape shall exhibit no adhesive flow on sides and no telescoping.

TABLE 3

Test Fluids Summary

| Fluid | Test Chemical | Test Temp. |
|---|---|---|
| Water | Distilled H$_2$O | 23 C. |
| Turbine Fuel | JP-8 Aviation Fuel | 23 C. |
| Lubricating Oil | MIL-PRF-7808 (Royco 808H) | 93 C. |
| Aircraft hydraulic Fluid | NSA 307110 Skydrol LD-4 | 23 C.-145 C. |
| Cleaning Agent | Isopropyl Alcohol | 23 C. |
| Deicing Agent | ISO 11075 Type 1 Cryotech Polar Plus-Concentrate | 23 C. |

TABLE 4

Results

| Fluid Resistance 35 hr dwell | 10 eraser double rubs |
|---|---|
| DI H2O 24 hr | no effect |
| JP-8 72 hr | no effect |
| MIL-7808 24 hr 93° C. | no effect |

TABLE 4-continued

| Results | |
|---|---|
| Fluid Resistance 35 hr dwell | 10 eraser double rubs |
| Skydrol LD-4 72 hr | no effect |
| IPA 72 hr | no effect |
| De-Icer 72 hr | no effect |

*2 markers/panel

It is specifically intended that the present invention not be limited to the embodiments and illustrations contained herein, but include modified forms of those embodiments including portions of the embodiments and combinations of elements of different embodiments as come within the scope of the following claims.

We claim:

1. A thermal transfer printable multilayer label tape comprising:
   (A) A clear topcoat layer comprising ethylene acrylic acid and having opposing first and second facial surfaces;
   (B) A clear first primer layer comprising opposing first and second facial surfaces with the first facial surface of the first primer layer in contact with the second facial surface of the topcoat layer;
   (C) A clear face sheet layer comprising opposing first and second facial surfaces with the first facial surface of the face sheet layer in contact with the second facial surface of the primer layer;
   (D) A clear second primer layer comprising opposing first and second facial surfaces with the first facial surface of the second primer layer in contact with the second facial surface of the face sheet layer;
   (E) A printed ink color layer comprising opposing first and second facial surfaces with the first facial surface of the color layer in contact with the second facial surface of the second primer layer;
   (F) An adhesive layer comprising opposing first and second facial surfaces with the first facial surface of the adhesive layer in contact with the second facial surface of the color layer; and
   (G) An optional release liner comprising opposing first and second facial surfaces with the first facial surface of the release liner in contact with the second facial surface of the adhesive layer.

2. The label tape of claim 1 in which the ethylene acrylic acid is crosslinked.

3. The label tape of claim 1 in which at least one of the first and second primer layers comprise a crosslinked thermoplastic polyester.

4. The label tape of claim 1 in which both the first and second primer layers comprise a crosslinked thermoplastic polyester.

5. The label tape of claim 1 in which the facesheet layer comprises a polyester.

6. The label tape of claim 1 comprising on the topcoat layer an ink received from a thermal transfer printer ribbon comprising a metal salt of an ethylene-methacrylic acid copolymer.

7. A fluid containing tube with the label tape of claim 1 attached.

8. The label tape of claim 1 in which the printed ink colored layer is a UV-ink graphic printed in reverse.

9. A thermal transfer printable multilayer label tape comprising:
   (A) A clear topcoat layer comprising crosslinked ethylene acrylic acid and having opposing first and second facial surfaces;
   (B) A clear first primer layer comprising a crosslinked thermoplastic polyester and having first and second facial surfaces with the first facial surface of the first primer layer in contact with the second facial surface of the topcoat layer;
   (C) A clear facesheet layer comprising a polyester and having opposing first and second facial surfaces with the first facial surface of the facesheet layer in contact with the second facial surface of the primer layer;
   (D) A clear second primer layer comprising a crosslinked thermoplastic polyester and having opposing first and second facial surfaces with the first facial surface of the second primer layer in contact with the second facial surface of the facesheet layer;
   (E) A printed ink color layer comprising opposing first and second facial surfaces in with the first facial surface is printed in reverse on the second facial surface of the second primer layer;
   (F) An adhesive layer comprising first and second facial surfaces with the first facial surface of the adhesive layer in contact with the second facial surface of the color layer; and
   (G) An optional release liner comprising opposing first and second facial surfaces with the first facial surface of the release liner in contact with the second facial surface of the adhesive layer.

10. The label tape of claim 1 in which the adhesive layer comprises a pressure sensitive adhesive.

11. The label tape of claim 1 in which the adhesive is a heat-sealable adhesive.

* * * * *